June 27, 1961 D. G. SMITH 2,989,787
FAIL-SAFE WINDOWS
Filed Feb. 13, 1957 2 Sheets-Sheet 2
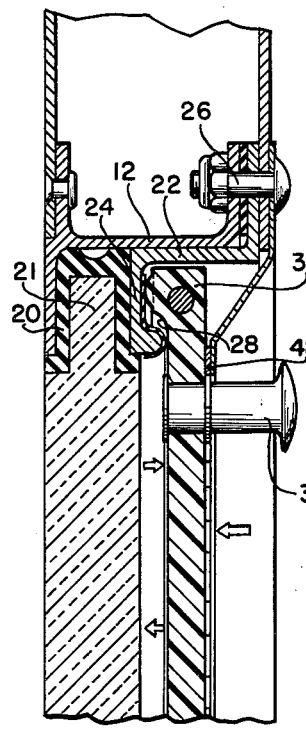
Fig. 2
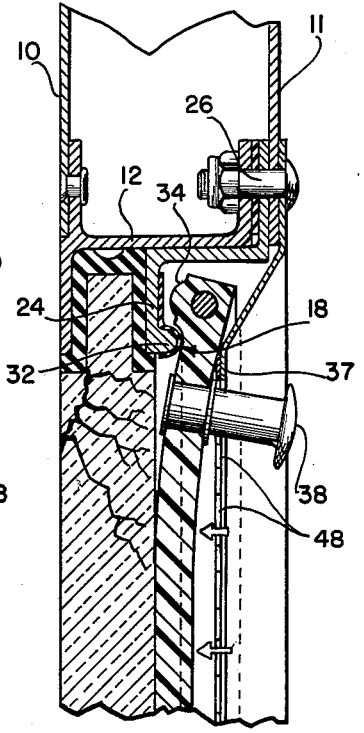
Fig. 3
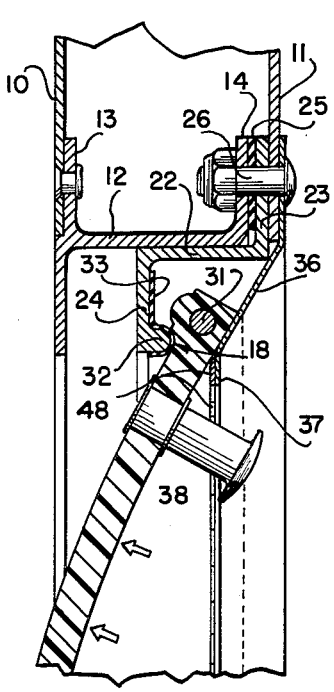
Fig. 4
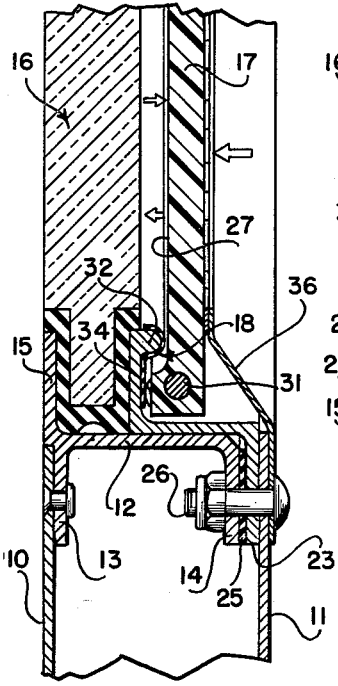
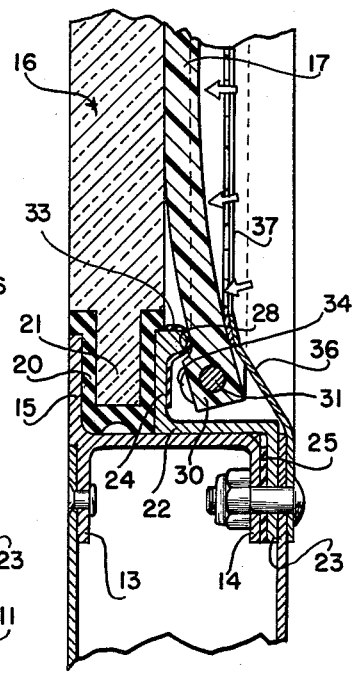
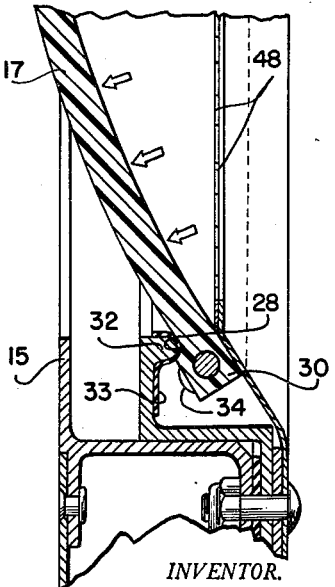
INVENTOR.
DONALD G. SMITH
BY
George C. Sullivan
Agent

United States Patent Office 2,989,787
Patented June 27, 1961

2,989,787
FAIL-SAFE WINDOWS
Donald G. Smith, Marietta, Ga., assignor to Lockheed Aircraft Corporation, Burbank, Calif.
Filed Feb. 13, 1957, Ser. No. 640,016
9 Claims. (Cl. 20—40)

This invention relates to the glazing of apertures and relates more particularly to transparent closures for window openings, and the like, of pressurized compartments such as the cabins and passenger compartments of pressurized aircraft.

In present day airplanes it is a common practice to pressurize the cockpits, cabins and compartments, that is, provide for the maintenance of air pressures within such inhabited compartments substantially higher than the ambient atmospheric pressures so as to preserve the comfort and well being of the passengers during high and relatively high altitude flights. Such pressurization results in high pressure differentials across the window closures or panes and it becomes necessary to guard against failure of the windows during pressurized flight since such failure may result in fatal or disastrous decompression effects. This essential safety has usually been accomplished by double-paned windows, each pane being designed to individually assume the full pressure differentials so that failure of one pane, say the outer pane, does not necessarily result in total failure of the window closure. Double-paned windows are, of necessity, heavy in weight, require duplication of pane supports and seals, and are costly to manufacture, install and maintain. In addition to the double-paned pressurized windows it is the general practice to provide each window with drapes, or curtains, so that entrance of sunlight may be controlled at will. These curtains require brackets, mouldings, etc. for installation and adjustment, materially complicate the overall assembly, and increase the initial cost and maintenance cost.

It is a general object of this invention to provide a single transparent paned closure or window incorporating fail-safe features to prevent decompression or appreciable loss of cabin pressure in the event of pane failure and variable light transmitting features to obviate the need for shades, curtains, or drapes. Thus the window means of this invention is simpler and cheaper to manufacture, install and maintain and is considerably lighter in weight than the conventional double-paned and curtained windows.

Another object of the invention is to provide a single structural panel window closure arrangement of this character in which the fail-safe feature prevents any appreciable loss of cabin pressure air in event the pressurized panel or its seal leaks as a result of cracking or light damage, and prevents any substantial loss of pressure if the pressurized single panel blows out or is otherwise destroyed. The device of the invention includes a flexible, transparent diaphragm constructed and arranged to assume the full pressure differentials in case the window pane proper cracks, leaks or fails as by sudden blow-out.

Another object of the invention is to provide a fail-safe transparent closure construction of the character described that may be installed flush with both the internal and external surfaces of the aircraft to obtain a clean, drag-free exterior and an interior free of dust collecting corners, mouldings, etc.

A further object of the invention is to provide a fail-safe pressurized window of this kind in which the intensity of the light transmitted therethrough may be easily controlled by the passenger or occupant from a maximum to a substantially complete cut-off of light. In the fail-safe window of this invention the pressure load assuming panel and the flexible transparent diaphragm are each light polarizing elements and by turning or moving the diaphragm with respect to the panel the occupant or operator may control, at will, the intensity of the light transmitted. Thus the diaphragm has the dual functions of a safety device for preventing pressure loss in the event of cracking or complete failure of the panel and of a controller for the intensity of the light being transmitted.

A still further object of this invention is to provide a window of this type having unique means for mounting the movable safety diaphragm which normally permits free access of cabin air to all surfaces of the diaphragm and the internal surface of the structural pane to prevent fogging while allowing free manual rotation of the diaphragm for the control of light transmission and which retains and seals the peripheral margins of the diaphragm when the latter takes over the function of assuming the pressure differential loads upon cracking or failure of the pane.

Other objectives and features will become apparent from the following detailed description of a typical preferred embodiment of the invention throughout which reference will be made to the accompanying drawings wherein:

FIGURE 2 is an enlarged vertical detailed sectional view of one of the windows taken substantially as indicated by line 2—2 on FIGURE 1 showing the parts in the normal positions;

FIGURE 3 is a view similar to FIGURE 2 showing the positions and condition of the parts when leakage occurs through the main pane; and FIGURE 4 is a view similar to FIGURE 2 showing the positions of the parts following complete blow-out of the main pane.

Figure 1:
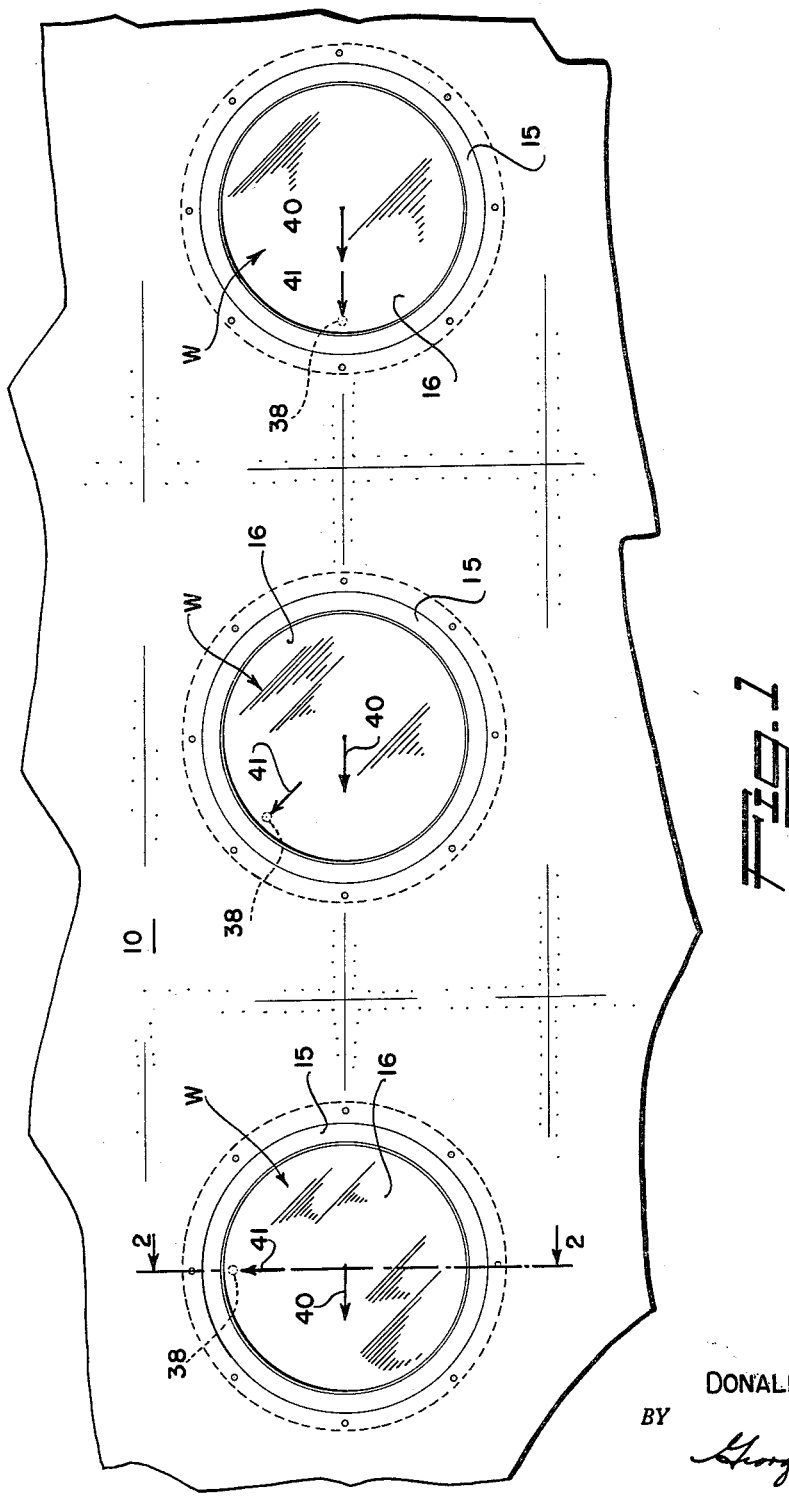
FIGURE 1 is a fragmentary, side elevation of an airplane fuselage, or the like, showing three windows of the invention incorporated therein, with arrows indicating the axes of the light polarization of the pane and diaphragm.

In FIGURE 1, I have shown three windows W of the invention in order to portray the controlability of the intensity of the light transmission. Since the windows W may be identical, I will proceed with a detailed description of one of them. The windows W can, of course, be mounted in airplane structures, and the like, of various kinds, and are capable of modification to adapt them for given applications. The portion of the airplane illustrated includes an outer skin 10 and an inner skin or "surface" 11 spaced therefrom. The window aperture of the skin 10 is provided with a flanged frame 12. The frame 12 has inner and outer flanges 13 and 14 associated or secured to the skin 10 and surface 11 respectively by appropriate fasteners, it being observed that the flange 14 is spaced inwardly from the skin 11. The frame 12 is also provided with a continuous web or flange 15 in or adjacent the plane of the outer skin 10 and projecting radially inward. The window W and the frame 12 are shown as being circular. Although this configuration is usually preferred, the window may, of course, be of other configuration.

Each window W of the invention may be considered as including a transparent light polarizing structural or pressure assuming pane 16, a flexible transparent light polarizing diaphragm 17 at the inner side of the pane 16, and mounting means 18 for supporting the diaphragm 17 for manual movement for the control of light transmision and for flexure of movement to pressure differential assuming positions in the event of leakage or failure of the pane 16.

The structural panel 16 may be a sheet of glass, a monolithic sheet of transparent plastic, or a laminated sheet of plastics, or glass and plastics. It is designed and proportioned to normally adequately assume or withstand all differentials in air pressures existing within and without the cabin or compartment and, as illustrated, may be a relatively thick member having flat parallel inner and outer surfaces. The pane or panel 16, or at least one lamination or layer thereof, is constructed of light polarizing material, for example material sold under the name "Polaroid." Means is provided for mounting and sealing the structural panel 16 in the frame 12. This means includes a seal 20 of rubber, synthetic rubber, or other suitable sealing material, of channel shape in transverse cross section. The seal 20 is engaged or cemented on a marginal rim 21 of reduced thickness provided on the panel 16. An annular flange member 22 fits within the frame 12 and has one flange 23 adjacent and parallel with the frame flange 14. A second flange 24 of the member 22 is spaced from and parallel with the lip or flange 15. The seal 20 and the rim 21 of the pane 16 are clamped between the flanges 15 and 24. Referring again to the flange 23, a sealing gasket 25 is arranged between the frame flange 14 and the flange 23 and the securing devices or bolts 26 securely clamp this assembly together. Further, the parts are constructed and arranged so that tightening of the bolts 26 insures the proper clamped engagement of the seal 20 and the rim 21 between the flanges 15 and 24 so as to mount and seal the structural pane 16.

The diaphragm 17 is a sheet or plate of somewhat flexible transparent plastic. The diaphragm 17 is light polarizing and may be construted of or include a "Polaroid" material. The materials of, or incorporated in, both the structural pane 16 and the diaphragm 17 are such as to impart substantially uniform polarization to the transmitted light. As illustrated in the drawings the diaphragm 17 is spaced at the inner side of the pane 16 to leave an air space or chamber 27. The inner and outer surfaces of the diaphragm 17 may be flat and parallel except where the outer surface curves outwardly at 28 to a thickened rim 30. In accordance with the invention, a compression hoop 31 of appropriate shape and material, such as steel or other metal, is embedded, attached or cast in this thickened rim 30. The hoop 31 reinforces the peripheral region of the diaphragm 17 to effectively resist excessive radial distortion when the diaphragm assumes the air pressure differentials.

The means 18 for mounting the diaphragm 17 normally retains the diaphragm in the position of FIGURE 2 where it is easily manually movable to vary the intensity of the transmitted light and where it allows access of cabin air to the chamber 27 to avoid fogging of the window surfaces. The diaphragm mounting means 18 supports the diaphragm for flexure to the positions of FIGURES 3 and 4 where it assumes the pressure exerted by the cabin air and where it maintains a sealing and anchoring engagement with the flange 24 to make the window "fail-safe" when the structural pane 16 leaks or blows out. The means 18 further includes a continuous bead 32 on the flange 24. The bead 32 faces or opposes the diaphragm 17 and has a curved or partially circular fulcrum surface. The above mentioned curve or shoulder 28 of the diaphragm 17 is concave and formed to mate with or receive the bead 32. A sealing strip 33 of rubber synthetic rubber, rubber impregnated fabric, or the like, is cemented or otherwise secured to the flange 24 and its bead 32 to seal with the shoulder 28 when the diaphragm 17 is flexed or bowed outwardly under the influence of the cabin air pressure. As shown in FIGURE 2, the shoulder 28 is spaced radially outward from the bead 32 so long as the presure in the chamber 27 remains substantially the same as the pressure in the compartment or cabin and the diaphragm therefore remains unflexed or undistorted. To insure that the chamber 27 remains in communication with the interior of the cabin with the diaphragm 17 in this condition, spaced bumps or lugs 34 may be provided on the rim 30 of the diaphragm to engage the flange 27 or the strip 33 to hold the diaphragm clear of the sealing strip.

The diaphragm mounting means 18 further includes a semi-flexible and resilient retainer 36 for bearing against the interior surface or compartment side of the diaphragm 17. This retainer 36 may be secured against the frame flange 23 by the bolts 26 and slopes from the flange 23 toward the diaphragm 17. The interior paneling, upholstery or surface 11, if present, may be sandwiched between flange 23 and retainer 36. The retainer 36 has an inner rim 37 for conforming to and bearing against the face of the diaphragm 17. This rim 37 may be interrupted, waved, corrugated or provided with nodules so as to maintain communication between the interior of the cabin and the chamber 27. Also, local pads 48 of "felt-like" material, or material of suitable frictional characteristics may be cemented or suitably fastened to either diaphragm 17 or flange 37 to serve as non-abrasive contact "spots" between the diaphragm 17 and rim 37, at the same time spacing them apart to maintain the desired communication between the rim 37 and the cabin interior. The resilient retainer 36 exerts a "spring" pressure against the diaphragm 17 to hold the same against the sealing strip 33 and thus hold the diaphragm in place in the window assembly. However, the spring pressure exerted by the retainer 36 is such that the diaphragm 17 may be deliberately or intentionally rotated manually. To facilitate such manual angular movement of the diaphragm 17 a knob or handle 38 is secured in an opening in the diaphragm, or otherwise attached to the diaphragm, and projects from its interior surface for ready manual engagement. The handle 38 is preferably arranged adjacent the marginal region of the diaphragm 17.

It is believed that the operation and features of the fail-safe variable-transparency window will be apparent from the foregoing detailed description. Under normal conditions where the strurctural pane 16 remains uncracked, unbroken and pressure-tight, the diaphragm 17 remains unflexed and in the construction illlustrated remains parallel with the pane 16. As above described, the diaphragm 17 rather loosely or freely fits in the window assembly so that the occupant by engaging the handle 38 may turn or move the diaphragm to vary, as he desires, the intensity of the light transmitted by the window. Thus in FIGURE 1 the arrow 40 represents the axis of polarization of the structural pane 16 while the arrow 41 represents the axis of polarization of the diaphragm 17. With the diaphragm 17 in the angular position where its axis of light polarization is parallel with the axis 40 of light polarization of the pane 16, as shown in the right hand window of FIGURE 1, there is a maximum transmission of light through the window. By moving or turning the diaphragm 17 to a position such as indicated by the arrow 41 in the central window of FIGURE 1, the axis of light polarization of the diaphragm 17 is approximately 45° to the axis of polarization of the structural pane 16 so that there is a medium transmission of light through the window. Again, by turning the diaphragm 17 to a position where its axis of light polarization 41 is substantially normal to the axis of light polarization 40 of the structural pane 16, as shown in the left hand window of FIGURE 1, there will be a substantially complete cut-off of light transmission through the window.

So long as the structural panel or pane 16 remains sound and there is no substantial leakage through the pane or its seal 21, the diaphragm 17 remains in the relatively free condition of FIGURES 1 and 2. However, in the event the structural panel 16 becomes cracked or partially broken to permit a considerable leakage of cabin air pressure outwardly therethrough, the differential in air pressures in the interior of the cabin and the chamber 27 causes the diaphragm 17 to bow or flex outwardly to a condition such as shown in FIGURE 3 and to be pressed outwardly so that its external surface has sealing pressural engagement on the sealing strip 33. The structural window pane 16 serves as a restraining or backing member for the partially flexed diaphragm 17 under such circumstances. However, it should be observed that the diaphragm 17 in cooperating with the seal strip 33 prevents any substantial leakage of cabin air pressure through the window. If the structural window pane 16 should blow out, the flexible diaphragm 17 is deflected by the cabin air pressure to a partially spherical shape and brings the shoulder 28 of the diaphragm into sealing and anchoring engagement with the region of the strip 33 engaging over the bead 32. The cabin air pressure acting on the diaphragm 17 to deflect the diaphragm into the spherical configuration resolves into hoop tension in the diaphragm which is balanced by hoop compression in the rim of diaphragm 17; other resultant loads are transmitted to the airframe structure through the interlocking engagement of the shoulder 28 and the bead 32. This is illustrated in FIGURE 4 where it will be seen that the shoulder 28 engaging on the sealing strip 33 at the bead 32, maintains an air tight seal so that the spherically deflected diaphragm reinforced at its margin by the hoop 31 and anchored in the frame as just described, constitutes a dependable closure for resisting the effect of the air pressure differential. It will be observed that the diaphragm 17 has the dual function of cooperating with the structural panel 16 in the transmission of light to form a "regulator" or adjuster for the intensitiy of the light transmitted and a safety element for preventing the sudden or substantial escape of air from the cabin in event of leakage or complete failure of the structural pane 16.

Having described only a typical form of the invention I do not wish to be limited to the specific details herein set forth, but wish to reserve to myself any variations or modifications that may appear to those skilled in the art and fall within the scope of the following claims.

I claim:

1. In a pressurizable aircraft compartment having a wall provided with a window opening, the combination of an outer transparent window panel, means securing and sealing the panel in said opening to extend thereacross and form a structural closure therefor which normally assumes the loads resulting from the differentials in compartment and ambient air pressures, a flexible transparent inner diaphragm extending across said opening at the compartment side of said panel in spaced relation thereto to leave an air space, means at the margin of the diaphragm mounting the diaphragm in said opening for angular movement and to normally maintain said space in limited communication with said compartment, said means including a fixed fulcrum ridge in said opening, a fulcrum shoulder on the diaphragm engagable with the ridge to anchor said margin for angular movement when said loads exerted on the diaphragm due to failure or extensive leakage of said panel cause outward deflection of the flexible diaphragm, and sealing means sealing with said margin to prevent leakage of air outwardly around the diaphragm when the diaphragm is thus deflected.

2. In a pressurizable aircraft compartment having a wall provided with a window opening, the combination of an outer transparent window panel, means securing and sealing the panel in said opening to extend thereacross and form a structural closure therefor which normally assumes the loads resulting from the differentials in compartment and ambient air pressures, a flexible transparent inner diaphragm extending across said opening at the compartment side of said panel in spaced relation thereto to leave an air space, and means at the margin of the diaphragm mounting the diaphragm in the opening for angular movement while maintaining said space in limited communication with the compartment, said means including fulcrum elements in said opening and on said margin cooperable to anchor said margin while allowing outward deflection of the diaphragm when said loads exerted on the diaphragm, in consequence of failure or extensive leakage of the panel, deflect the diaphragm outwardly against the leaking panel or through the plane previously occupied by the failed panel.

3. In a pressurizable aircraft compartment having a wall provided with a window opening, the combination of an outer transparent window panel, means securing and sealing the panel in said opening to extend thereacross and form a structural closure therefor which normally assumes the loads resulting from the differentials in compartment and ambient air pressures, a flexible transparent inner diaphragm extending across said opening at the compartment side of said panel in spaced relation thereto to leave an air space, means at the margin of the diaphragm mounting the diaphragm in the opening for angular movement while maintaining said space in limited communication with the compartment, said means including fulcrum elements in said opening and on said margin cooperable to anchor said margin while allowing outward deflection of the diaphragm when said loads exerted on the diaphragm, in consequence of failure or extensive leakage of the panel, deflect the diaphragm outwardly against the leaking panel or through the plane previously occupied by the failed panel, and said margin of the diaphragm having a reinforcing ring associated therewith to resist radial distortion of the diaphragm when the diaphragm is thus deflected.

4. In a pressurizable aircraft compartment having a wall provided with a window opening, the combination of an outer transparent window panel, means securing and sealing the panel in said opening to extend thereacross and form a structural closure therefor which normally assumes the loads resulting from the differentials in compartment ambient air pressures, a flexible transparent inner diaphragm extending across said opening at the compartment side of said panel in spaced relation thereto to leave an air space, and means at the margin of the diaphragm mounting the diaphragm in the opening for angular movement while maintaining said space in limited communication with the compartment, said means including fulcrum elements in said opening and on said margin cooperable to anchor said margin while allowing outward deflection of the diaphragm when said loads exerted on the diaphragm, in consequence of failure or extensive leakage of the panel, deflect the diaphragm outwardly against the leaking panel or through the plane previously occupied by the failed panel, and said margin of the diaphragm including a compression hoop therein for resisting radial distortion of the diaphragm when the diaphragm is deflected outwardly.

5. In a pressurizable aircraft compartment having a wall provided with a window opening, the combination of an outer transparent window panel, means securing and sealing the panel in said opening to extend thereacross and form a structural closure therefor which normally assumes the loads resulting from the differentials in compartment and ambient air pressures, a flexible transparent inner diaphragm extending across said opening at the compartment side of said panel normally having the compartment pressure on both sides thereof, means freely mounting the margin of the diaphragm in said opening to support the diaphragm in spaced relation to said panel and including cooperable fulcrum elements on the wall of the opening and the side of the diaphragm opposing the panel adjacent the peripheral margin of the diaphragm, said elements operating to anchor the margin of the diaphragm when the diaphragm is deflected outwardly under the influence of said loads when said panel fails or leaks excessively, and a resilient retainer on the wall pressing against the other side of the diaphragm adjacent the peripheral margin thereof to retain the diaphragm in the position where said elements are engageable.

6. In a pressurizable aircraft compartment having a wall provided with a window opening, the combination of an outer transparent window panel, means securing and sealing the panel in said opening to extend thereacross and form a structure closure therefor which normally assumes the loads resulting from the differentials in compartment and ambient air pressures, a flexible transparent inner diaphragm extending across said opening at the compartment side of said panel in spaced relation thereto to leave an air space, means at the margin of the diaphragm mounting the diaphragm in the opening for angular movement while maintaining said space in limited communication with the compartment, said means including fulcrum elements in said opening and on said margin cooperable to anchor said margin while allowing outward deflection of the diaphragm when said loads exerted on the diaphragm, in consequence of failure or extensive leakage of the panel, deflect the diaphragm outwardly against the leaking panel or through the plane previously occupied by the failed panel, and a resilient retainer on the wall pressing against the compartment side of the diaphragm adjacent the margin thereof to hold the diaphragm in its operative position.

7. In a pressurizable aircraft compartment having a wall provided with a window opening, the combination of an outer transparent window panel, means securing and sealing the panel in said opening to extend thereacross and form a structural closure therefor which normally assumes the loads resulting from the differentials in compartment and ambient air pressures, a flexible transparent inner diaphragm extending across said opening at the compartment side of said panel, and means freely mounting the margin of the diaphragm in said opening to support the diaphragm in spaced relation to said panel and including fulcrum elements anchoring said margin for angular movement when said loads are exerted on said diaphragm due to failure or extensive leakage of said panel and said loads cause deflection of the diaphragm outwardly in the opening, said panel and diaphragm each being a light-polarizing member whereby angular movement of the diaphragm relative to the panel varies the intensity of the light transmitted by the combination of the panel and diaphragm.

8. In a pressurizable aircraft compartment having a wall provided with a window opening, the combination of an outer transparent window panel, means securing and sealing the panel in said opening, the combination of an outer transparent window panel, means securing and sealing the panel in said opening to extend thereacross and form a structural closure therefor which normally assumes the loads resulting from the differentials in compartment and ambient air pressures, a flexible transparent inner diaphragm extending across said opening at the compartment side of said panel in spaced relation thereto to leave an air space, and means at the margin of the diaphragm mounting the diaphragm in the opening for angular movement while maintaining said space in limited communication with the compartment, said panel and diaphragm each being a light-polarizing member to impart polarization to light transmitted therethrough, the diaphragm being manually rotatable relative to the panel to relatively adjust the axes of light polarization of the panel and diaphragm and thus vary the intensity of the light transmitted by the combination of the panel and diaphragm, said means including fulcrum elements in said opening and on said margin cooperable to anchor said margin while allowing outward deflection of the diaphragm when said loads exerted on the diaphragm, in consequence of failure or extensive leakage of the panel, deflect the diaphragm outwardly against the leaking panel or through the plane previously occupied by the failed panel.

9. In a pressurizable aircraft compartment having a wall provided with a window opening, the combination of an outer transparent window panel, means securing and sealing the panel in said opening to extend thereacross and form a structural closure therefor which normally assumes the loads resulting from the differentials in compartment and ambient air pressures, a flexible transparent inner diaphragm extending across said opening at the compartment side of said panel in spaced relation thereto to leave an air space, means at the margin of the diaphragm mounting the diaphragm in the opening for angular movement while maintaining said space in limited communication with the compartment, said means including fulcrum elements in said opening and on said margin cooperable to anchor said margin while allowing outward deflection of the diaphragm when said loads exerted on the diaphragm, in consequence of failure or extensive leakage of the panel, deflect the diaphragm outwardly against the leaking panel or through the plane previously occupied by the failed panel, and a resilient retainer on the wall pressing against the compartment side of the diaphragm adjacent the margin thereof to hold the diaphragm in its operative position, the retainer sloping with respect to the diaphragm, and being yieldable to conform with the diaphragm when the same is deflected outwardly.

References Cited in the file of this patent
UNITED STATES PATENTS

| | | |
|---|---|---|
| 2,261,035 | Miller | Oct. 28, 1941 |
| 2,311,840 | Land | Feb. 23, 1943 |
| 2,575,757 | Hardy | Nov. 20, 1951 |
| 2,613,402 | Gouge | Oct. 14, 1952 |